: US 11,530,705 B2
(45) Date of Patent: Dec. 20, 2022

(12) United States Patent
Beers

(54) BEARING COOLING SCHEMES FOR AIRCRAFT FANS

(71) Applicant: Hamilton Sundstrand Corporation, Charlotte, NC (US)

(72) Inventor: Craig M. Beers, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 92 days.

(21) Appl. No.: 16/950,019

(22) Filed: Nov. 17, 2020

(65) Prior Publication Data

US 2022/0154723 A1   May 19, 2022

(51) Int. Cl.
| | |
|---|---|
| *F04D 25/06* | (2006.01) |
| *B64D 13/06* | (2006.01) |
| *F01D 25/12* | (2006.01) |
| *F02C 7/06* | (2006.01) |
| *F04D 25/08* | (2006.01) |
| *F04D 29/056* | (2006.01) |
| *F04D 29/057* | (2006.01) |

(52) U.S. Cl.
CPC ............ *F04D 25/06* (2013.01); *B64D 13/06* (2013.01); *F01D 25/125* (2013.01); *F02C 7/06* (2013.01); *F04D 25/082* (2013.01); *F04D 29/056* (2013.01); *F04D 29/057* (2013.01); *F05D 2220/323* (2013.01); *F05D 2240/52* (2013.01); *F05D 2260/213* (2013.01)

(58) Field of Classification Search
CPC ...... F04D 19/00; F04D 19/002; F04D 19/005; F04D 19/007; F04D 25/06; F04D 29/04; F04D 29/056; F04D 29/58; F04D 29/5806; F02C 7/06; F05D 2220/323; F05D 2240/52; B64D 13/06; B64D 13/08; B64D 27/026; H02K 9/06; F02K 3/00
See application file for complete search history.

(56) References Cited

U.S. PATENT DOCUMENTS

| | | | |
|---|---|---|---|
| 4,542,623 A | | 9/1985 | Hovan et al. |
| 4,645,415 A | * | 2/1987 | Hovan ................. F01D 25/125 60/39.83 |
| 7,988,426 B2 | | 8/2011 | Elpern et al. |
| 9,879,602 B2 | | 1/2018 | Munsell et al. |
| 9,914,542 B2 | | 3/2018 | Colson et al. |
| 10,018,116 B2 | | 7/2018 | Ackermann et al. |
| 2006/0061221 A1 | | 3/2006 | McAuliffe et al. |
| 2015/0233291 A1 | * | 8/2015 | Pelagatti ................... F02C 6/08 60/785 |
| 2016/0363003 A1 | * | 12/2016 | Davidson .............. F04D 29/053 |

(Continued)

FOREIGN PATENT DOCUMENTS

EP    2407380 A2    1/2012

OTHER PUBLICATIONS

European Search Report for Application No. 21204526.4-1004 dated Apr. 8, 2022, 8 pp.

*Primary Examiner* — Loren C Edwards
(74) *Attorney, Agent, or Firm* — Cantor Colburn LLP

(57) ABSTRACT

Aircraft and aircraft blower systems are described. The blower systems include a shaft, a motor having a stator and a rotor, the rotor being operably coupled to the shaft, a fan operably coupled to the shaft and configured to be driven by rotation of the shaft, one or more bearings arranged along the shaft, and a high pressure cooling source configured to supply high pressure air to the one or more bearings.

18 Claims, 4 Drawing Sheets

(56) References Cited

U.S. PATENT DOCUMENTS

2017/0016349 A1* 1/2017 Venter .................... F01D 15/12
2017/0167292 A1   6/2017 Army et al.
2018/0050806 A1* 2/2018 Kupiszewski ............ F02K 5/00
2018/0347398 A1  12/2018 Falkus et al.
2020/0325904 A1* 10/2020 Himmelmann ........... F02C 7/18

* cited by examiner

BEARING COOLING SCHEMES FOR AIRCRAFT FANS

BACKGROUND

The present disclosure generally relates to cooling schemes for aircraft fans, and more specifically, cooling schemes for aircraft fans that employ foil bearings.

Bearing cooling flow supply for motor driven fans using foil bearings originates from a low pressure source, such as ram air. These types of fans are traditionally used in environmental control systems. There is a need to use such fans/blowers as engine accessories to flow cool air through items including, but not limited to, oil coolers. Such engine accessories may have higher temperatures and thus cooling of bearings related to the fans/blowers may be more difficult than conventional configurations of such systems. Accordingly, improved cooling schemes for such fans/blowers may be desirable.

BRIEF DESCRIPTION

According to some embodiments, aircraft blower systems are provided. The systems include a shaft, a motor having a stator and a rotor, the rotor being operably coupled to the shaft, a fan operably coupled to the shaft and configured to be driven by rotation of the shaft, one or more bearings arranged along the shaft, and a high pressure cooling source configured to supply high pressure air to the one or more bearings.

In addition to one or more of the features described above, or as an alternative, further embodiments of the systems may include that the high pressure cooling source is a low pressure compressor of a gas turbine engine.

In addition to one or more of the features described above, or as an alternative, further embodiments of the systems may include a main flow path defined within the aircraft blower system and a heat exchanger arranged within the main flow path and configured to receive the high pressure air along one path of the heat exchanger and to receive air flowing through the main flow path along another path of the heat exchanger.

In addition to one or more of the features described above, or as an alternative, further embodiments of the systems may include that the one or more bearings are foil bearings.

In addition to one or more of the features described above, or as an alternative, further embodiments of the systems may include that the one or more bearings are journal bearings.

In addition to one or more of the features described above, or as an alternative, further embodiments of the systems may include that the one or more bearings are thrust bearings.

In addition to one or more of the features described above, or as an alternative, further embodiments of the systems may include that the one or more bearings comprise a combination of journal bearings and thrust bearings.

In addition to one or more of the features described above, or as an alternative, further embodiments of the systems may include a low pressure cooling source configured to supply low pressure cooling air to the motor.

In addition to one or more of the features described above, or as an alternative, further embodiments of the systems may include that the low pressure cooling source is a ram air inlet.

In addition to one or more of the features described above, or as an alternative, further embodiments of the systems may include that the high pressure cooling source is configured to supply air having a pressure of 15 psia or greater.

According to some embodiments, aircraft are provided. The aircraft include a gas turbine engine and an aircraft blower system. The blower system includes a shaft, a motor having a stator and a rotor, the rotor being operably coupled to the shaft, a fan operably coupled to the shaft and configured to be driven by rotation of the shaft, one or more bearings arranged along the shaft, and a high pressure cooling source configured to supply high pressure air to the one or more bearings.

In addition to one or more if the features described above, or as an alternative, further embodiments of the aircraft may include that the high pressure cooling source is a low pressure compressor of the gas turbine engine.

In addition to one or more of the features described above, or as an alternative, further embodiments of the aircraft may include a main flow path defined within the aircraft blower system and a heat exchanger arranged within the main flow path and configured to receive the high pressure air along one path of the heat exchanger and to receive air flowing through the main flow path along another path of the heat exchanger.

In addition to one or more if the features described above, or as an alternative, further embodiments of the aircraft may include that the one or more bearings are foil bearings.

In addition to one or more of the features described above, or as an alternative, further embodiments of the aircraft may include that the one or more bearings are journal bearings.

In addition to one or more of the features described above, or as an alternative, further embodiments of the aircraft may include that the one or more bearings are thrust bearings.

In addition to one or more of the features described above, or as an alternative, further embodiments of the aircraft may include that the one or more bearings comprise a combination of journal bearings and thrust bearings.

In addition to one or more of the features described above, or as an alternative, further embodiments of the aircraft may include a low pressure cooling source configured to supply low pressure cooling air to the motor.

In addition to one or more of the features described above, or as an alternative, further embodiments of the aircraft may include that the low pressure cooling source is a ram air inlet.

In addition to one or more of the features described above, or as an alternative, further embodiments of the aircraft may include that the high pressure cooling source is configured to supply air having a pressure of 15 psia or greater.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
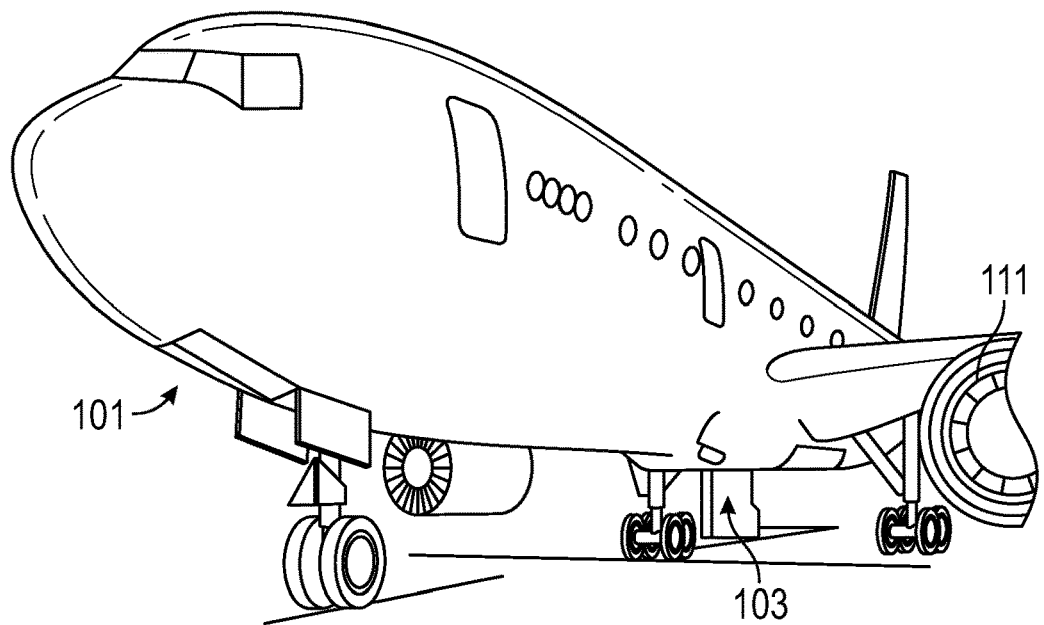
FIG. 1A is a schematic illustration of an aircraft that can incorporate various embodiments of the present disclosure.
Figure 1B:
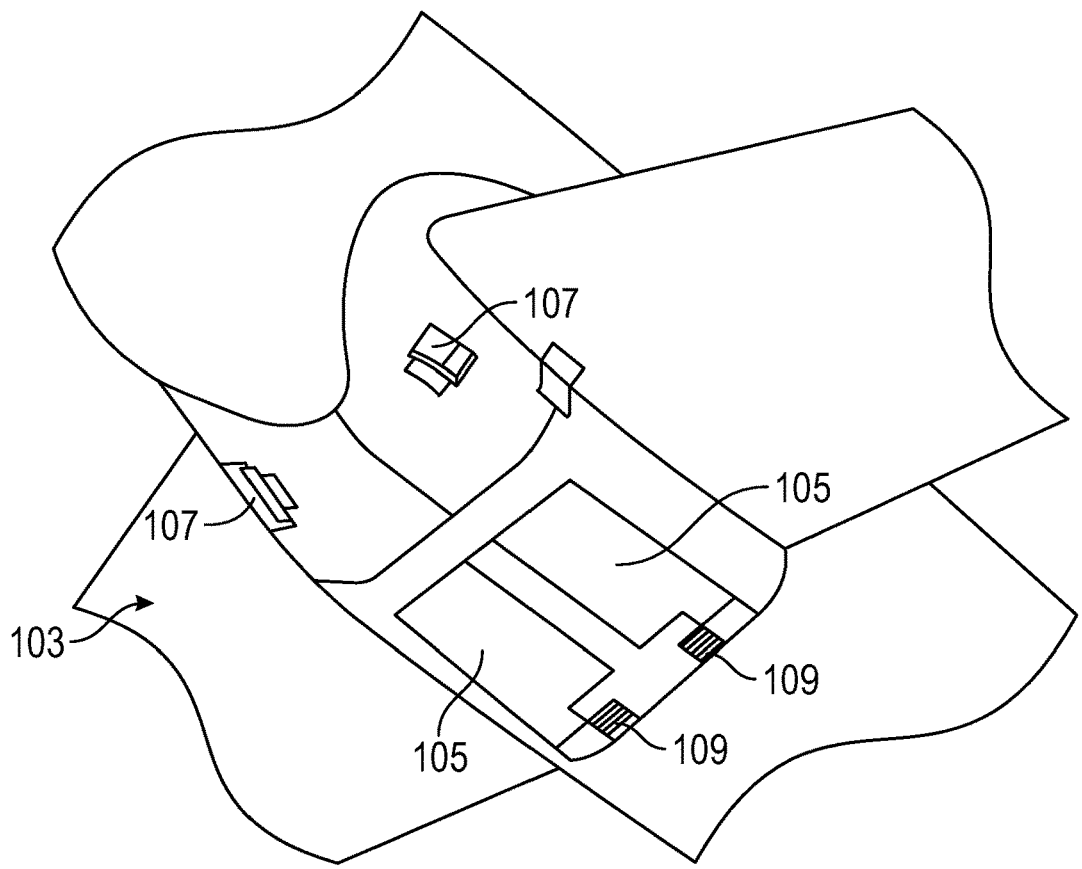
FIG. 1B is a schematic illustration of a bay section of the aircraft of FIG. 1A.

FIGS. 1A-1B are schematic illustrations of an aircraft 101 that can employ one or more embodiments of the present disclosure. As shown in FIGS. 1A-1B, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109.

Also shown in FIG. 1A, the aircraft 101 includes one or more engines 111. The engines 111 are typically mounted on wings of the aircraft 101 but may be located at other locations depending on the specific aircraft configuration. In some aircraft configurations, air can be bled from the engines 111 and supplied to environmental control systems and/or fuel inerting systems, as will be appreciated by those of skill in the art. The engines 111 may be configured to generate both thrust for flight and electrical power generation for operation of electronics and/or other components onboard the aircraft 101.

Figure 2:
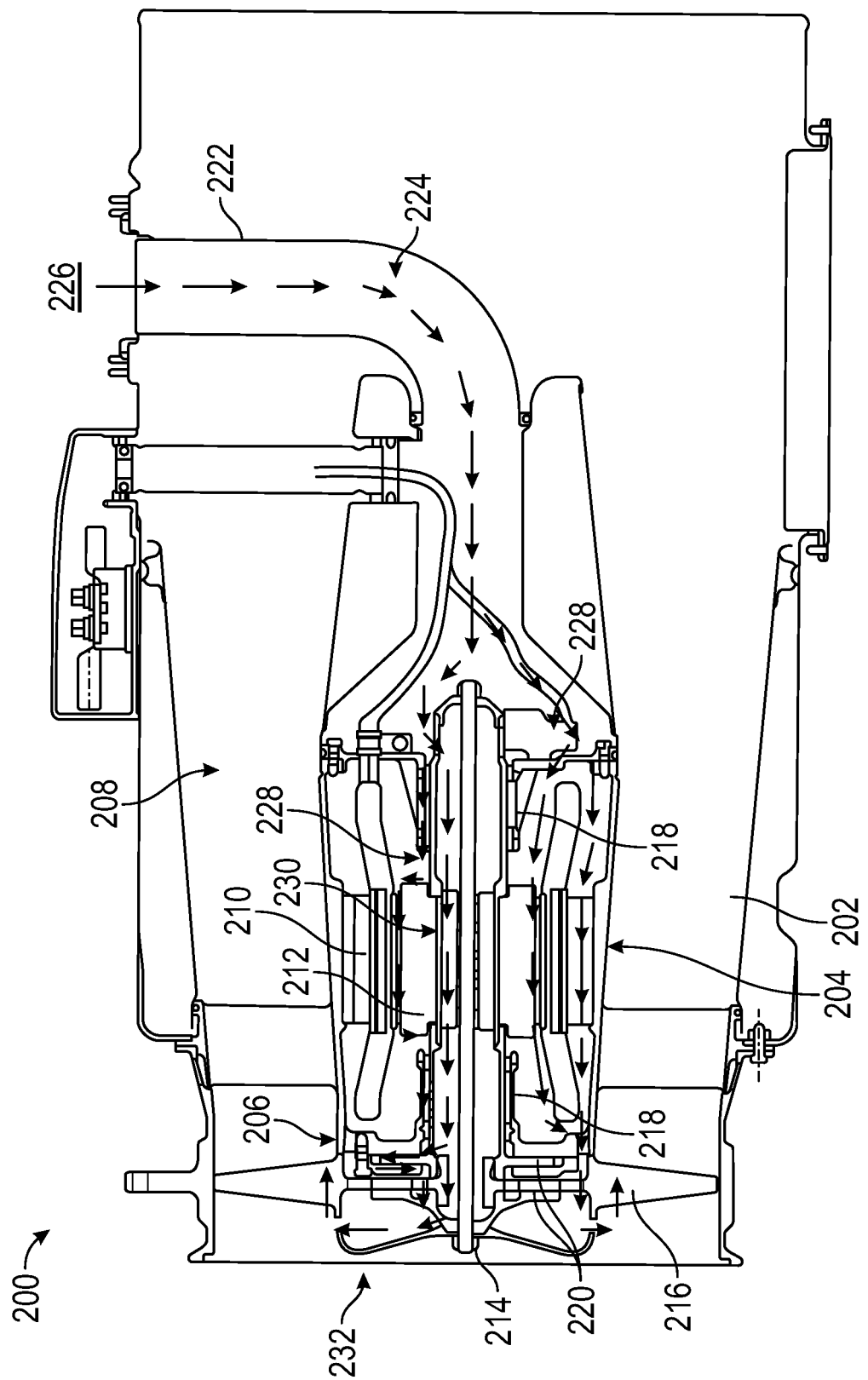
FIG. 2 is a schematic illustration of a fan of an aircraft that may incorporate embodiments of the present disclosure.

Turning now to FIG. 2, an example of an aircraft blower system 200 is shown. The aircraft blower system 200, also referred to as a fan system, may be arranged onboard an aircraft to provide cooling air for various auxiliary systems, such as environmental control systems of the aircraft. The aircraft blower system 200 includes a housing 202 with a motor section 204 and a fan section 206 arranged within the housing 202. A main flow path 208 is defined between the motor section 204 and an interior of the housing 202 with the fan section 206 arranged at an inlet side 232 of the aircraft blower system 200.

The motor section 204 includes a stator 210 and a rotor 212, with the rotor 212 coupled to a shaft 214. The fan section 206 includes fan blades 216 that are coupled to the shaft 214 such that rotation of the shaft 214 causes rotation of the fan blades 216. The aircraft blower system 200 includes a number of foil-type bearings arranged about the shaft 214. For example, as shown, journal bearings 218 may be arranged along the shaft 214 and thrust bearings 220 may be arranged about a fan disk that supports the fan blades 216. In this illustrative configuration there are two sets of journal bearings 218 and two sets of thrust bearings 220. It will be appreciated that aircraft blower systems may include more or a smaller number of bearings and/or arranged in different locations, without departing from the scope of the present disclosure.

The rotor 212, the stator 210, and the bearings 218, 220 require cooling during operation. In a conventional system, as shown in FIG. 2, a cooling air conduit 222 is arranged to supply a cooling air 224 to components of the aircraft blower system 200. The cooling air 224 may be sourced from a cooling air supply 226, such as a ram air inlet (e.g., as shown in FIG. 1B). The cooling air 224 sourced from a ram air inlet has relatively low pressure due to that fact that the ram air is scooped from ambient air external to the aircraft.

The cooling air 224 may separate into multiple cooling flows within the motor section 204. For example, a motor cooling flow 228 will be directed through and around components of the motor (e.g., the rotor 212 and the stator 210). A portion of the cooling air 224 will be directed into and/or along the shaft 214 to form a bearing cooling flow 230. The bearing cooling flow 230 and the motor cooling flow 228 will merge at an inlet side 232 of the aircraft blower system 200 and enter the main flow path 208 proximate the fan blades 216.

In this configuration, the bearing cooling flow 230 is supplied from the same source (cooling air source 226) as the source for the motor cooling flow 228. As noted, this is typically sourced from a ram air inlet of the aircraft, and thus is a low pressure source. This configuration of an aircraft blower system is conventionally used in aircraft environmental control systems. However, there is a need to use such blowers as engine accessories to flow cool air through components, including but not limited to, oil coolers, electronics, increased capacity-nitrogen generation systems, and environmental control systems. Due to high vibration loads and bearing cooling requirements, it may be required that a high-pressure air source is employed for bearing cooling. However, high pressure engine air is too hot to cool the bearings and thus a mechanism for employing high pressure cooling air is desirable.

Figure 3:
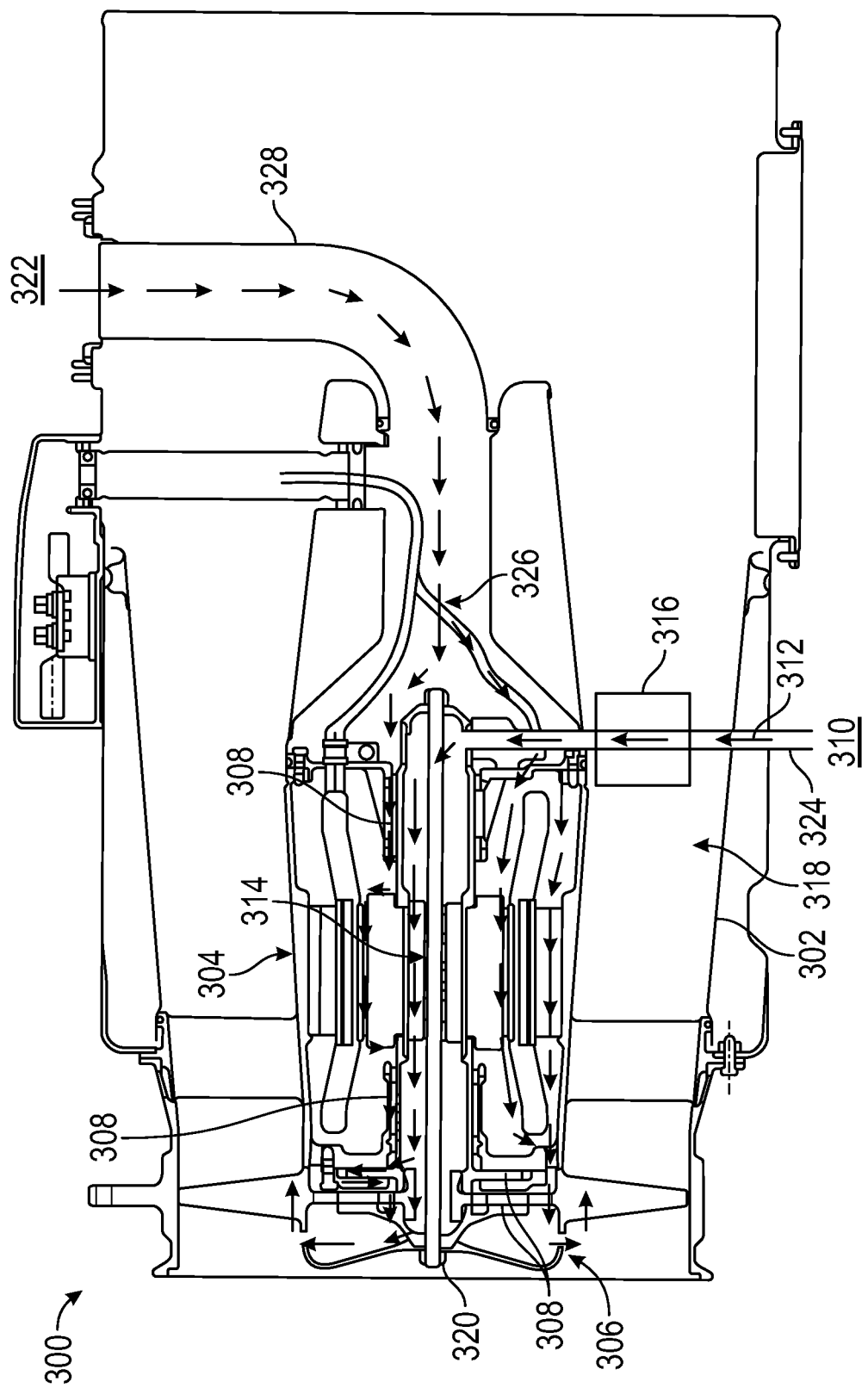
FIG. 3 is a schematic illustration of a fan of an aircraft illustrating a cooling configuration in accordance with an embodiment of the present disclosure.

Turning now to FIG. 3, a schematic illustration of an aircraft blower system 300 in accordance with an embodiment of the present disclosure is shown. The aircraft blower system 300, also referred to as a fan system, may be arranged onboard an aircraft to provide cooling air for various auxiliary systems, such as environmental control systems of the aircraft. The aircraft blower system 300 includes a housing 302 with a motor section 304 and a fan section 306 arranged within the housing 302. The aircraft blower system 300 includes foil-type bearings 308 (e.g., journal bearings and thrust bearings) similar to that shown and described above, for example.

In this embodiment, the cooling scheme is different in that a high pressure source is employed to provide high pressure cooling air to the bearings of the system. To achieve this, in this embodiment, a high pressure air source 310 is tapped within the aircraft to provide high pressure air sufficient to address high vibration loads of the aircraft blower system 300. For example, such increase pressure can provide improved load capacity by minimizing the impacts of vibrations of individual component and between components of the system. The high pressure air source 310 may be a compressor section (e.g., low pressure compressor stage of a gas turbine engine). High pressure air 312 from the high pressure air source 310 may be at an elevated temperature due to compression from the compressor of the gas turbine engine. As such, the high pressure air 312 must be cooled prior to being supplied and form a bearing cooling flow 314. To reduce the temperature of the high pressure air 312, a heat exchanger 316 may be arranged within a main flow path 318 of the aircraft blower system 300. The heat exchanger 316 is configured to allow thermal interaction between the high pressure air 312 and the cooler air within the main flow path 318 to thus lower a temperature of the high pressure air 312. The cooled high pressure air 312 will then flow into and/or around a shaft 320 of the aircraft blower system 300.

As shown, a low pressure air source 322 may be used similar to the configuration shown in FIG. 2 and provide low pressure cooling air to components of the motor section 304 (e.g., stator and/or rotor). The bearing cooling flow 314 may be supplied through a high pressure cooling air conduit 324 that connects to and/or passes through the heat exchanger 316. A motor cooling flow 326 may be provided through a low pressure cooling air conduit 328, as shown.

In some non-limiting examples, the high pressure cooling air supplied from the high pressure air source may have a pressure of 15-30 psia and the low pressure cooling air supplied from the low pressure air source may have a pressure of about ambient pressure (e.g., sourced from ram air inlet). In accordance with some embodiments, and for example, the high pressure cooling air configuration can increase the ratio of bearing cooling supply pressure to sea level atmospheric pressure to values in the range of 1.0-2.0 to permit the use of increased power motors to improve performance, and also permit higher operating loads which includes but is not limited to operation at higher speeds and the ability to install fans in high-vibration locations on an aircraft. In accordance with some embodiments, by providing such increased pressures, bearing capacity may increase by about 50% as pressure ratio approaches 2.0. Furthermore, bearing capacity will continue to increase at pressure ratios greater than 2.0, but such increases may be lower level and the rate of increase may become negligible.

Figure 4:
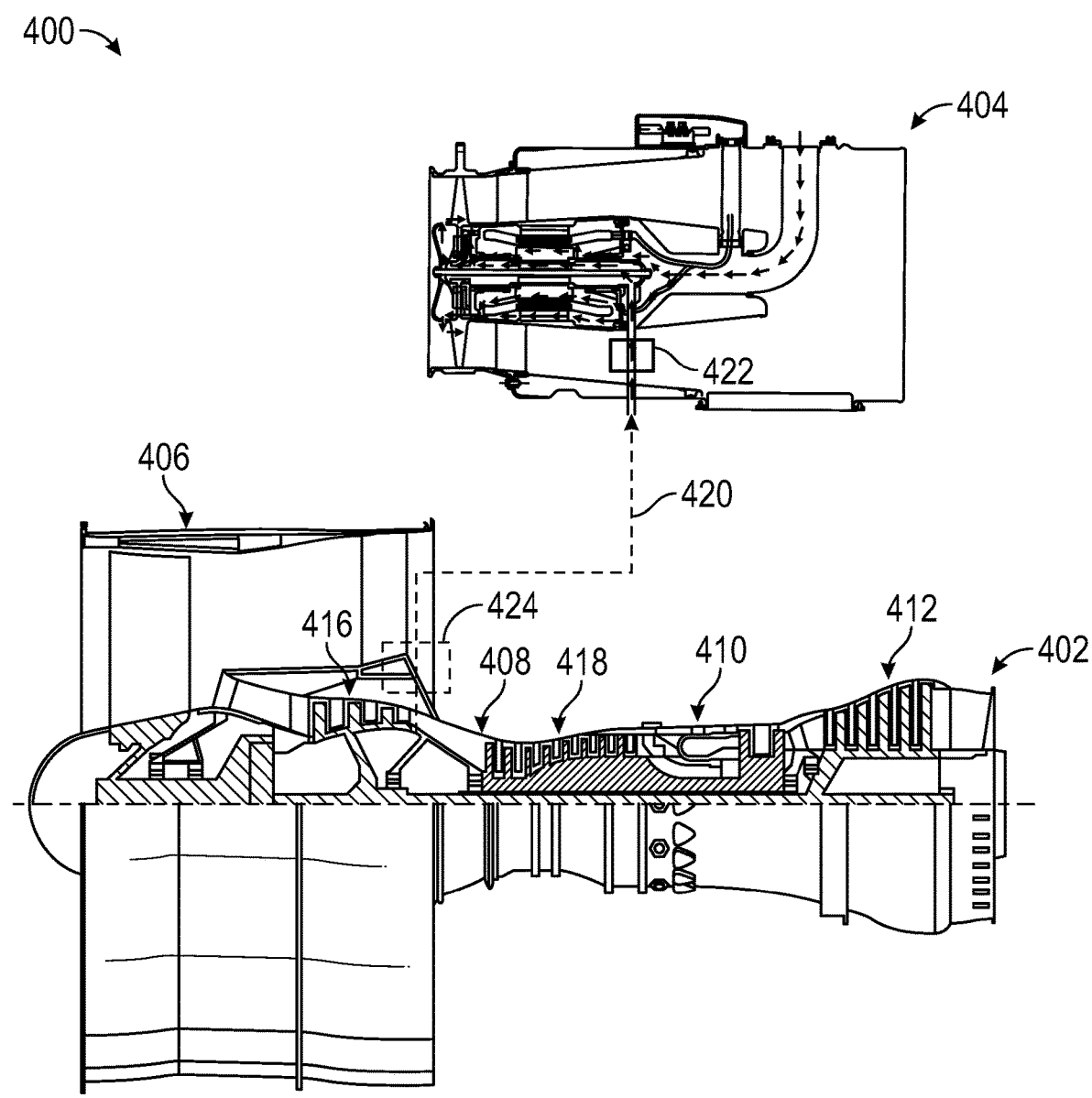
FIG. 4 is a schematic diagram of an aircraft system arrangement in accordance with an embodiment of the present disclosure.

Turning now to FIG. 4, a schematic diagram of an aircraft system 400 in accordance with an embodiment of the present disclosure is shown. The aircraft system 400 includes a gas turbine engine 402 and an aircraft blower system 404. The aircraft blower system 404 may be similar to that shown and described above with respect to FIG. 3, for example. The gas turbine engine 402 includes a fan section 406, a compressor section 408, a combustor section 410, and a turbine section 412. The compressor section 408 includes a low pressure compressor stage 416 and a high pressure compressor stage 418. In an embodiment of the present disclosure, a tap line 420 is configured to extract a portion of air being compressed within the low compressor stage 416 and direct such extracted air to the aircraft blower system 404. The extracted air will be relatively warm, and thus a heat exchanger 422 may be arranged within the aircraft blower system 404 to cool the extracted air prior to supplying the high pressure air to bearings of the aircraft blower system 404.

Although shown with the heat exchanger 422 arranged in the aircraft blower system 404, the position thereof is not to be limiting. For example, in some embodiments, the heat exchanger of the aircraft blower system 404 can be located on the outside of an engine casing surrounding an engine core, such as at location 424 shown in FIG. 4. In this configuration, the engine fan flow is used as the heat sink for cooling the bleed air that is then supplied to the bearings of the aircraft blower system 404.

Advantageously, embodiments described herein provide for improved cooling schemes for bearings of aircraft blower systems. A tap line may be provided to extract a portion of high pressure air from a low pressure compressor stage of a gas turbine engine as a source of high pressure air. This tap line or conduit may be run through a heat exchanger configured to use fan stream air as a heat sink to cool the high pressure air. The high pressure, cooler air that exits the heat exchanger is now a source of bearing cooling air for the aircraft blower system. This high pressure cooling air is provided to enable more demanding fan applications than conventional systems. During operation, when at low pressures, the bearing capacity is reduced and thus high pressure cooling may not be required. However, with higher bearing cooling air supply pressure, the bearings will have increased load capacity. The increase load capacity provided by the increased pressure can lead to an extended range of applications where the aircraft blower system is be exposed to higher loading (vibration, etc.), higher heat loads, increased speeds, aero thrust loads, etc.

The use of the terms "a," "an," "the," and similar references in the context of description (especially in the context of the following claims) are to be construed to cover both the singular and the plural, unless otherwise indicated herein or specifically contradicted by context. The modifier "about," "substantially," and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description but is only limited by the scope of the appended claims.

What is claimed is:

1. An aircraft blower system, the system comprising:
   a shaft;
   a motor having a stator and a rotor, the rotor being operably coupled to the shaft to drive rotation of the shaft;
   a fan operably coupled to the shaft and configured to be driven by rotation of the shaft, wherein the fan is configured to generate a cooling air for one or more auxiliary systems of an aircraft;
   one or more bearings arranged along the shaft;
   a high pressure cooling source configured to supply a high pressure cooling air to the one or more bearings, wherein the high pressure cooling source comprises a tap line fluidly connecting a low pressure compressor stage of a gas turbine engine to the aircraft blower system; and
   a low pressure cooling source configured to supply a low pressure cooling air to the motor, wherein the low pressure cooling air and the high pressure cooling air are fluidly separate as each enters the aircraft blower system.

2. The system of claim 1, wherein the one or more auxiliary systems comprise an environmental control system of the aircraft.

3. The system of claim 1, further comprising:
a main flow path defined within the aircraft blower system; and
a heat exchanger arranged within the main flow path and arranged along the tap line, the heat exchanger configured to receive the high pressure cooling air along one path of the heat exchanger, wherein the path of the high pressure cooling air through the heat exchanger defines a portion of the tap line, and to receive air flowing through the main flow path of the aircraft blower system along another path of the heat exchanger.

4. The system of claim 1, wherein the one or more bearings are foil bearings.

5. The system of claim 1, wherein the one or more bearings are journal bearings.

6. The system of claim 1, wherein the one or more bearings are thrust bearings.

7. The system of claim 1, wherein the one or more bearings comprise a combination of journal bearings and thrust bearings.

8. The system of claim 1, wherein the low pressure cooling source is a ram air inlet.

9. The system of claim 1, wherein the high pressure cooling source is configured to supply the high pressure cooling air having a pressure of 15 psia or greater.

10. An aircraft comprising:
a gas turbine engine;
an aircraft auxiliary system; and
an aircraft blower system configured to generate a cooling air for the aircraft auxiliary system, the aircraft blower system comprising:
a shaft;
a motor having a stator and a rotor, the rotor being operably coupled to the shaft to drive rotation of the shaft;
a fan operably coupled to the shaft and configured to be driven by rotation of the shaft;
one or more bearings arranged along the shaft;
a high pressure cooling source configured to supply a high pressure cooling air to the one or more bearings, wherein the high pressure cooling source comprises a tap line fluidly connecting a low pressure compressor stage of the gas turbine engine to the aircraft blower system; and
a low pressure cooling source configured to supply a low pressure cooling air to the motor, wherein the low pressure cooling air and the high pressure cooling air are fluidly separate as each enters the aircraft blower system.

11. The aircraft of claim 10, wherein the gas turbine engine comprises a fan section, a compressor section, a combustor section, and a turbine section, wherein the low pressure compressor stage is part of the compressor section.

12. The aircraft of claim 10, further comprising:
a main flow path defined within the aircraft blower system; and
a heat exchanger arranged within the main flow path and arranged along the tap line, the heat exchanger configured to receive the high pressure cooling air along one path of the heat exchanger, wherein the path of the high pressure cooling air through the heat exchanger defines a portion of the tap line, and to receive air flowing through the main flow path of the aircraft blower system along another path of the heat exchanger.

13. The aircraft of claim 10, wherein the one or more bearings are foil bearings.

14. The aircraft of claim 10, wherein the one or more bearings are journal bearings.

15. The aircraft of claim 10, wherein the one or more bearings are thrust bearings.

16. The aircraft of claim 10, wherein the one or more bearings comprise a combination of journal bearings and thrust bearings.

17. The aircraft of claim 10, wherein the low pressure cooling source is a ram air inlet.

18. The aircraft of claim 10, wherein the high pressure cooling source is configured to supply the high pressure cooling air having a pressure of 15 psia or greater.

* * * * *